358-86. OR 2,938,075 SR

SEARCH ROOM

T5003

May 24, 1960 E. J. GARGINI 2,938,075

WIRED ELECTRICAL SIGNAL DISTRIBUTING SYSTEMS

Filed May 16, 1955

INVENTOR
E. J. Gargini
by Glascock Downing & Seebold
ATTORNEYS 2,938,075
Patented May 24, 1960

2,938,075

WIRED ELECTRICAL SIGNAL DISTRIBUTING SYSTEMS

Eric John Gargini, Yiewsley, West Drayton, England, assignor to Electric & Musical Industries Limited, Hayes, England, a company of Great Britain Filed May 16, 1955, Ser. No. 508,657

Claims priority, application Great Britain May 18, 1954

4 Claims. (Cl. 178—6)

Figure 1:
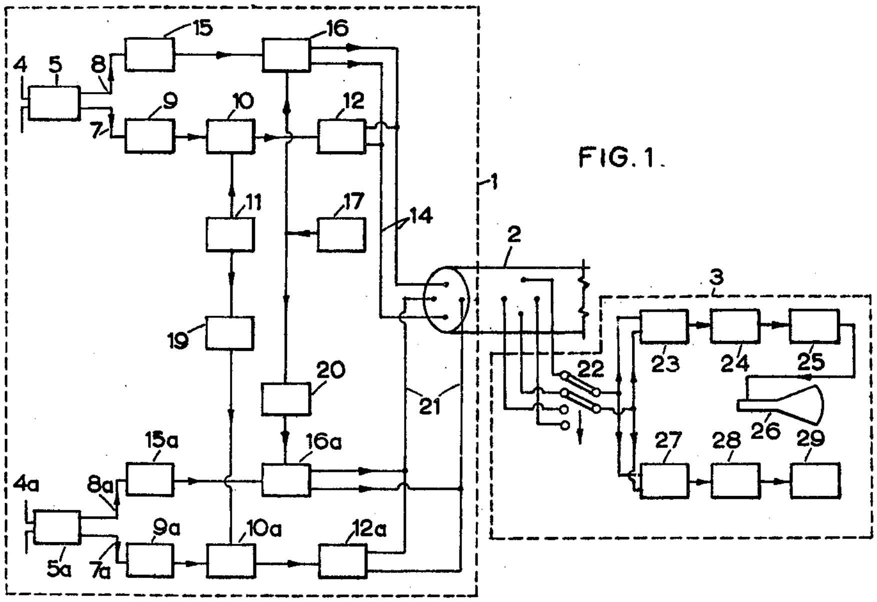

This invention relates to wired electrical signal distributing systems and it has especial, though not exclusive, reference to television relay systems.

A form of cable commonly used in wired signal distributing systems, for instance television relay systems, is so-called screened "star-quad" cable. Such cable comprises two balanced pairs of conductors and the conductors are enclosed in an outer metallic sheath. Evidently it is desirable to make the most effective use of the cable and in some cases where a star-quad cable is used, it may be desired to relay two different television programmes on the respective pairs of conductors. In that case, it is usually a practical necessity, having regard to cable losses, to transmit the video signals of the different television programmes on carrier waves and substantial economy of receiver components can be achieved by arranging that the modulation frequency components of the two carrier waves occupy a common frequency zone. However unless special precautions are taken the cross-talk which occurs between the conductors of the cable is such as to produce interference beyond a tolerable limit between the different programmes. In United States patent application Serial No. 326,527, now Patent No. 2,906,815, one proposal is described for reducing such interference, this proposal involving the transmission of the video signals of the different television programmes on carrier waves so chosen that the upper sideband components of one carrier wave occupy a frequency zone which substantially overlaps the frequency zone occupied by the lower sideband component of the other carrier wave, the lower sideband components of the first carrier wave and the upper sideband components of the second carrier wave being substantially attenuated.

The object of the present invention is to provide an alternative and improved wired signal distributing system, with a view to reducing difficulties such as indicated in the preceding paragraph.

According to the present invention there is provided a wired signal distributing system comprising transmission means including means for generating a first carrier wave, means for generating a second carrier wave of the same frequency as and in phase quadrature relationship with said first carrier wave, modulating means for respectively modulating said carrier waves with different intelligence signals, a plurality of receivers, adjacent cable circuits one for each modulating means, each connected from the respective modulating means to said receivers to apply the modulated carrier waves simultaneously to all said receivers, each of said receivers including a single demodulating means and switching means for selectively connecting the different cable circuits to said single demodulating means for demodulating the carrier wave transmitted by means of the selected cable circuit.

The present invention can be applied not only to the transmission of video signals on carrier waves, but may also, or alternatively, be applied to the transmission of scanning signals which can be used either for deriving or synchronising scanning waveforms at receivers in a television relay system.

Figure 2:
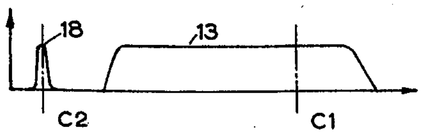
Figure 3:
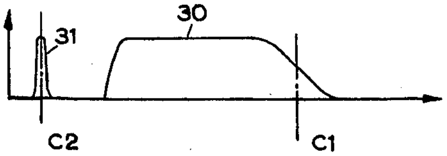
Figure 4:
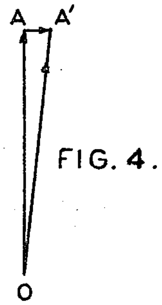

In order that the invention may be clearly understood and readily carried into effect, the invention will be described with reference to the accompanying drawings, in which:

Figure 1 illustrates in block form one example of a television relay system in accordance with the present invention, Figures 2 and 3 are waveform diagrams explanatory of the operation of Figure 1, and Figure 4 is a further diagram explanatory of Figure 1.

Referring to the drawings, the arrangement illustrated in Figure 1 comprises a distributing unit which is shown enclosed by the dotted outline 1 and which is adapted to relay two television programmes to a plurality of television receivers. The programmes are relayed by a star-quad cable a fragment of which is represented at 2 and receivers are connected to the cable as required, one such receiver being represented within the dotted outline 3. The unit 1 has two sections one of which is adapted to receive and relay one of the television programmes and the other of which is adapted to receive and relay the other television programme and since the two sections are substantially similar only one section will be described in detail. This comprises an aerial 4 for picking up the corresponding broadcast television waveform and applying it to a receiving circuit which is denoted in general by reference 5. This circuit, which may be of the superheterodyne type, may be similar in construction to a conventional television receiver as far as the point at which the video signals and synchronising signals are separated, and it will be assumed that on operation of the receiver, the video signals are fed to the conductor 7 and the synchronising signals fed to the conductor 8. The video signals are then fed to an amplifier 9 and to a modulator 10 where they are caused to modulate the amplitude of a carrier wave derived from an oscillator 11 and having for example a frequency of 5.42 mc./s. The modulated carrier wave output from 10 is applied, after any necessary amplification, to a filter 12 which serves to suppress the upper sideband components of the modulated carrier wave, leaving only a relatively narrow band of components near the carrier frequency and corresponding to low video frequencies. For example, the frequency spectrum of the output of the filter 12 may be as represented by the curve 13 in Figure 2, the carrier frequency being denoted by the vertical line $F_{c1}$. The distributing unit 1 therefore has a vestigial sideband response and the signals derived from the filter 12 are applied to one pair of the conductors of the star-quad cable 2 namely the conductors 14. The synchronising signals which are fed from the receiver 5 to the conductor 8 are fed to a scanning signal generator 15 which is arranged to produce a single scanning waveform from which separate line and frame frequency scanning signals can be derived at the receivers by simple circuits, this waveform being synchronised with the received synchronising signals. The construction of the generator 15 forms no part of the present invention, and it may, for example, be of the construction described in United States patent application Serial No. 232,577, now Patent No. 2,836,649. The scanning waveform derived from the generator 15 is fed to a modulator 16 and is there caused to amplitude modulate a carrier wave derived from an oscillator 17 and having for example a frequency of 1 mc. the frequency spectrum of this carrier wave after modulation is represented by 18 in Figure 2, the carrier frequency being denoted by the vertical line $F_{c2}$. The modulated carrier wave derived from the modulator 16 is fed to the pair of conductors 14 of the star-quad cable 2 in parallel with the signals derived from the filter circuit 12.

As aforesaid, the other section of the distributing unit is similar to the section described and corresponding parts are denoted by the same reference numerals but with the addition of the suffix *a*. However, the oscillators 11 and 17 are common to both sections but the carrier wave from these oscillators, before being fed to the respective modulators **10*a* and 16*a*, are passed through phase shifting networks 19 and 20 respectively and these networks are each designed to impart a 90° phase shift to the corresponding carrier waves. The carrier wave modulated with the video signals of the second television programme and derived from the filter 12*a* is applied to the other pair of conductors of the star-quad cable 2, namely the conductors 21, and the carrier wave modulated with the scanning signal waveform for this programme is also applied to this pair of conductors. Moreover it will be appreciated that the frequency spectra of these two carrier waves are the same as the frequency spectra of the corresponding carrier waves applied to the conductors 14 and are therefore represented by the curves 13 and 18** of Figure 2. However the two carrier waves modulated by the different video signals are maintained in phase quadrature, and similarly the two carrier waves modulated by the different scanning signals are maintained in phase quadrature.

The television receiver 3 comprises a manual switch 22 which can be operated to connect the cable circuit comprising the conductors 14 or the cable circuit comprising the conductors 21 selectively to an amplifier 23. It will be assumed that this amplifier has a frequency response characteristic similar to that represented by the curve 30 in Figure 3 and is therefore insensitive to the carrier waves $F_{c2}$ and their sideband components. The output of the amplifier 23 is applied to a demodulator 24 which sets up, in known manner, an output of the video signals which were modulated on the received carrier wave. The video signals are then suitably amplified in an amplifier 25 and applied to the modulator electrode of a cathode ray image reproducing tube 26. The switch 22 also connects the selected cable circuit to an amplifier 27 which has a response characteristic corresponding to the curve 31 of Figure 3 and is therefore responsive only to the carrier waves modulated with the scanning waveform. The carrier wave amplified by 27 is demodulated in demodulator 28 and the demodulated signals are then applied to the scanning circuit of the receiver which is merely shown in block form at 29, but is preferably of the construction described in co-pending United States patent application Serial No. 436,933.

By virtue of the phase quadrature relationship adopted say, for the two carrier waves which are modulated with the different video signals, the disturbance caused on reproduced pictures in the receiver 3 due to cross-talk between the cable circuits 14 and 21 is substantially eliminated. This is illustrated in Figure 4 in which the vector OA represents the amplitude of the desired carrier wave received from, say, the cable circuit 14, assuming the manual switch 22 to be in the position shown in Figure 1. The vector AA′ represents the amplitude of the undesired carrier wave picked up by the cable circuit 14 from the circuit 21. The level of AA′ may be of the order of 30 dm. lower than that of OA, but though the magnitude of AA′ is small it may nevertheless be sufficient to produce more than tolerable disturbance of reproduced pictures corresponding to OA, if the two vectors be in phase. However, since the two carrier waves are in phase quadrature, the vector AA′ is always at right angles to the vector OA and the resultant amplitude distortion of the signal actually passed by the switch 22 to the receiver is negligibly small. This is represented in Figure 3, in which the vector OA′ represents the amplitude of the carrier wave actually applied to the demodulator 24 via the amplifier 23. The disturbance on the pictures reproduced by the cathode ray tube 26 is therefore hardly apparent and it will be appreciated that this result is independent of the type of the demodulator 24. Thus, though the demodulator 24 is required to demodulate one or other of two carrier waves which are in phase quadrature, the demodulator need not be of the homodyne type. The demodulator 24 is thus, in the present example, an amplitude modulation detector of conventional construction, and to distinguish from demodulators of the homodyne type the demodulator 24 is referred to as a passive demodulator, signifying that its operation does not depend on the injection into it of locally generated oscillations which have a fixed frequency relationship with the received carrier oscillations. By virtue of the present invention the isolation between the different cable circuits can be apparently increased to the equivalent of about 20 db of attenuation or more, although the same frequency is used for the carrier waves for the different video signals, and the same channel is used at the receiver for receiving the different programmes. It is also an important feature of the invention that it is the lower sideband of each carrier wave modulated by vision signals which is transmitted and that it is the upper sideband components which are substantially attenuated. Cross-talk between the cable circuits increases with increasing frequency and therefore the liability for cross-talk to occur is greater at the upper frequency end of the curve 13 than at the lower frequency end. Moreover the frequency components near the upper end of the curve 13 correspond to low video frequencies, and low frequency interference is more noticeable on reproduced pictures than high frequency interference. However the phase quadrature relationship adopted between the two carrier waves has its maximum effect if both upper and lower side-band components are present. Therefore the improvement which is achieved by use of the phase quadrature relationship is greatest at those frequencies where the cross-talk is liable to be greatest and/or most disturbing.

The phase quadrature relationship between the two carrier waves used for the different scanning waveforms also reduces the disturbing effect of interference between these carriers, in the same manner as explained with reference to Figure 3.

While the invention is especially applicable to television relay systems, the invention is also applicable to other wired electrical signal distributing systems.

What I claim is:

1. A wired transmission system comprising transmission means including means for generating a first carrier wave, means for generating a second carrier wave of the same frequency as and in phase quadrature relationship with said first carrier wave, modulating means for respectively modulating said carrier waves with different intelligence signals, a plurality of receivers, adjacent cable circuits one for each modulating means, each connected from the respective modulating means to said receivers to apply the modulated carrier waves simultaneously to all said receivers, each of said receivers including a single demodulating means and switching means for selectively connecting the different cable circuits to said single demodulating means for demodulating the carrier wave transmitted by means of the selected cable circuit.

2. A system according to claim 1 adapted for relaying television programmes, comprising means for deriving different sets of video signals to constitute said intelligence signals, and filter means for substantially attenuating some sideband components of the respective modulated carrier waves.

3. A system according to claim 1, adapted for relaying television programmes, comprising means for deriving scanning signals for different television programmes to constitute said intelligence signals.

4. A system according to claim 1 wherein said demodulating means comprises a passive demodulator.

References Cited in the file of this patent

UNITED STATES PATENTS

| | | |
|---|---|---|
| 1,733,609 | Kuhn | Oct. 29, 1929 |
| 2,017,886 | Barden | Oct. 22, 1935 |
| 2,241,586 | Dorsman | May 13, 1941 |
| 2,256,317 | Earp | Sept. 16, 1941 |
| 2,294,209 | Roder | Aug. 25, 1942 |
| 2,352,634 | Hull | July 4, 1944 |
| 2,570,475 | Oestreicher | Oct. 9, 1951 |
| 2,696,523 | Thiele | Dec. 7, 1954 |
| 2,697,746 | Kennedy | Dec. 21, 1954 |
| 2,787,660 | Teer | Apr. 2, 1957 |

FOREIGN PATENTS

| | | |
|---|---|---|
| 454,710 | Canada | Feb. 22, 1949 |